(12) United States Patent
Hua

(10) Patent No.: US 10,101,995 B2
(45) Date of Patent: Oct. 16, 2018

(54) TRANSFORMING DATA MANIPULATION CODE INTO DATA WORKFLOW

(71) Applicant: Microsoft Technology Licensing, LLC, Redmond, WA (US)

(72) Inventor: Nian Hua, Beaverton, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/211,334

(22) Filed: Jul. 15, 2016

(65) Prior Publication Data
US 2018/0018167 A1    Jan. 18, 2018

(51) Int. Cl.
G06F 9/44 (2018.01)
G06F 8/74 (2018.01)
G06N 99/00 (2010.01)
G06F 8/34 (2018.01)

(52) U.S. Cl.
CPC .............. *G06F 8/74* (2013.01); *G06F 8/34* (2013.01); *G06N 99/005* (2013.01)

(58) Field of Classification Search
CPC ............... G06F 8/23; G06F 8/71; G06F 8/75
USPC ......................................................... 717/123
See application file for complete search history.

(56) References Cited

U.S. PATENT DOCUMENTS

| 6,370,683 B1 | 4/2002 | Sobers |
| 7,580,911 B2 | 8/2009 | Sun et al. |
| 7,701,869 B2 | 4/2010 | Hogan |
| 7,882,490 B2 | 2/2011 | Kodosky et al. |
| 8,537,160 B2 | 9/2013 | Hargrove et al. |
| 8,656,346 B2 | 2/2014 | Kodi et al. |

(Continued)

FOREIGN PATENT DOCUMENTS

| CN | 103412783 A | 11/2013 |
| WO | 2006092388 A1 | 9/2006 |
| WO | 2007076630 A1 | 7/2007 |

OTHER PUBLICATIONS

Gil, Yolanda, "Intelligent Workflow Systems and Provenance-Aware Software", In Proceedings of the Seventh International Congress on Environmental Modeling and Software, Jun. 15, 2014, 8 pages.

(Continued)

*Primary Examiner* — John Chavis
(74) *Attorney, Agent, or Firm* — Buckley, Maschoff & Talwalkar LLC

(57) ABSTRACT

Aspects extend to methods, systems, and computer program products for transforming data manipulation code into data workflow. Data manipulation code for a data science process is written in a data manipulation programming language. The data manipulation code defines input instructions, data manipulation instructions, and output instructions. A learning module automatically transforms the data manipulation code into a data workflow representative of the data science process. The level of detail for a data workflow can be tailored for an intended audience and/or for subsequent editing with an editor program (e.g., a drawing program). Aspects of the invention address the disconnection between designing a data science process and documenting the data science process. The creation of data workflows is automated, virtually eliminating manual operations and providing significant productive gains for data scientists, data engineers, developers, and program managers.

15 Claims, 6 Drawing Sheets

(56) References Cited

U.S. PATENT DOCUMENTS

| | | |
|---|---|---|
| 8,782,596 B2 | 7/2014 | Hayles |
| 9,436,507 B2* | 9/2016 | Mishra ................... G06Q 10/06 |
| 2005/0154741 A1 | 7/2005 | Hebert et al. |
| 2005/0256818 A1 | 11/2005 | Sun et al. |
| 2006/0111888 A1 | 5/2006 | Hiew et al. |
| 2008/0178146 A1* | 7/2008 | Koehler ................. G06F 8/10 717/106 |
| 2008/0216069 A1* | 9/2008 | Leymann ............... G06Q 10/10 717/174 |
| 2010/0042745 A1 | 2/2010 | Maeda et al. |
| 2010/0106547 A1* | 4/2010 | Adi ......................... G06F 8/30 705/7.27 |
| 2012/0290587 A1* | 11/2012 | Peyton .................... G06F 8/34 707/749 |
| 2014/0032617 A1 | 1/2014 | Stanfill |
| 2016/0011905 A1 | 1/2016 | Mishra et al. |
| 2016/0012350 A1 | 1/2016 | Narayanan et al. |
| 2016/0371117 A1* | 12/2016 | Mishra ................... G06Q 10/06 |
| 2017/0185904 A1* | 6/2017 | Padmanabhan .......... G06N 5/04 |
| 2017/0249580 A1* | 8/2017 | Newman ........ G06Q 10/063116 |

OTHER PUBLICATIONS

"code2flow", Published on: Nov. 10, 2013 Available at: http://code2flow.com/professionals.

"Wings", Published on: Aug. 23, 2013 Available at: http://www.wing-workflows.org/about.

Lin, et al., "A Task Abstraction and Mapping Approach to the Shimming Problem in Scientific Workflows", In Proceedings of the IEEE International Conference on Services Computing, Sep. 21, 2009, pp. 284-291.

"International Search Report and Written Opinion Issued in PCT Application No. PCT/US2017/041432", dated Oct. 12, 2017, 12 pages.

* cited by examiner

```
Example setwd("~/testwd/test")

Read in Prediction data and actual data
DSInput = list()
DSInput[[1]] = read.csv('Tester1_Answer_All.csv', header = T, sep = ",")
DSInput[[2]] = read.csv('Tester2_Answer_All.csv', header = T, sep = ",")
DSInput[[3]] = read.csv('Tester3_Answer_All.csv', header = T, sep = ",")
DSInput[[4]] = read.csv('Tester4_Answer_All.csv', header = T, sep = ",")
TRUEVALUE = read.csv('TRUEVALUE.csv', header = T, sep = ",")

DSEval = matrix(NA, 20, 6)

# Calculate Metrics
BEG_ROW = 1
END_ROW = min(which(is.na(TRUEVALUE$Notes)))-1 tabitr = 1
preditr = 1
for (preditr in BEG_ROW:END_ROW){
  for (tabitr in 1:4){
    DSEval[preditr, tabitr] = 1-(1/2)* sum((as.numeric(DSInput[[tabitr]][preditr,BEG_COL:END_COL])
                              - unfactor(TRUEVALUE[preditr, BEG_COL:END_COL]))^2)
  }
} rownames(DSEval) = DSInput[[1]][,1]
colnames(DSEval) = c("G", "J", "Q", "S")

# Construct output files
DSEval
write.table(DSEval, "Metrics.csv", row.names=F, sep = ",")
```

- INPUT INSTRUCTIONS 401
- DATA MANIPULATION INSTRUCTIONS 402
- OUTPUT INSTRUCTIONS 403

FIG. 4

TRANSFORMING DATA MANIPULATION CODE INTO DATA WORKFLOW

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

Data science is field about processes and systems to extract knowledge or insights from data. When a data scientist develops a new data science process, he or she may be required to document how source code written to implement the data science process works. Documenting a data science process insures process integrity as well as provides stakeholder visibility. It is often a requirement that each step in a data science process is clearly documented for future reference. Further, documentation for a data science process usually has to be in a form that is understandable to non-data scientists (e.g., executives, managers, etc.).

Documenting data science processes typically involves the data scientist manually generating a data workflow (possibly with assistance of a drawing program) for their data science process. The data workflow abstracts out more technical aspects of the underlying code.

BRIEF SUMMARY

Examples extend to methods, systems, and computer program products for transforming data manipulation code into data workflow. Data manipulation code for a data science process is accessed. The data manipulation code includes data instructions in a programming language. The data instructions include data input instructions for accessing data from one or more data sources, data manipulation instructions for manipulating the data accessed from the one or more data sources, and data output instructions for outputting data formed by the data manipulation instructions.

A machine learning algorithm transforms the data manipulation code into a data workflow representative of the data science process. The data workflow provides a view on the data input instructions, data manipulation instructions, and data output instructions. The machine learning algorithm was previously trained using training data manipulation code sets and corresponding expected data workflows. The data workflow is output to document the data science process.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 4 is an example of data manipulation code.

DETAILED DESCRIPTION

Figure 1:
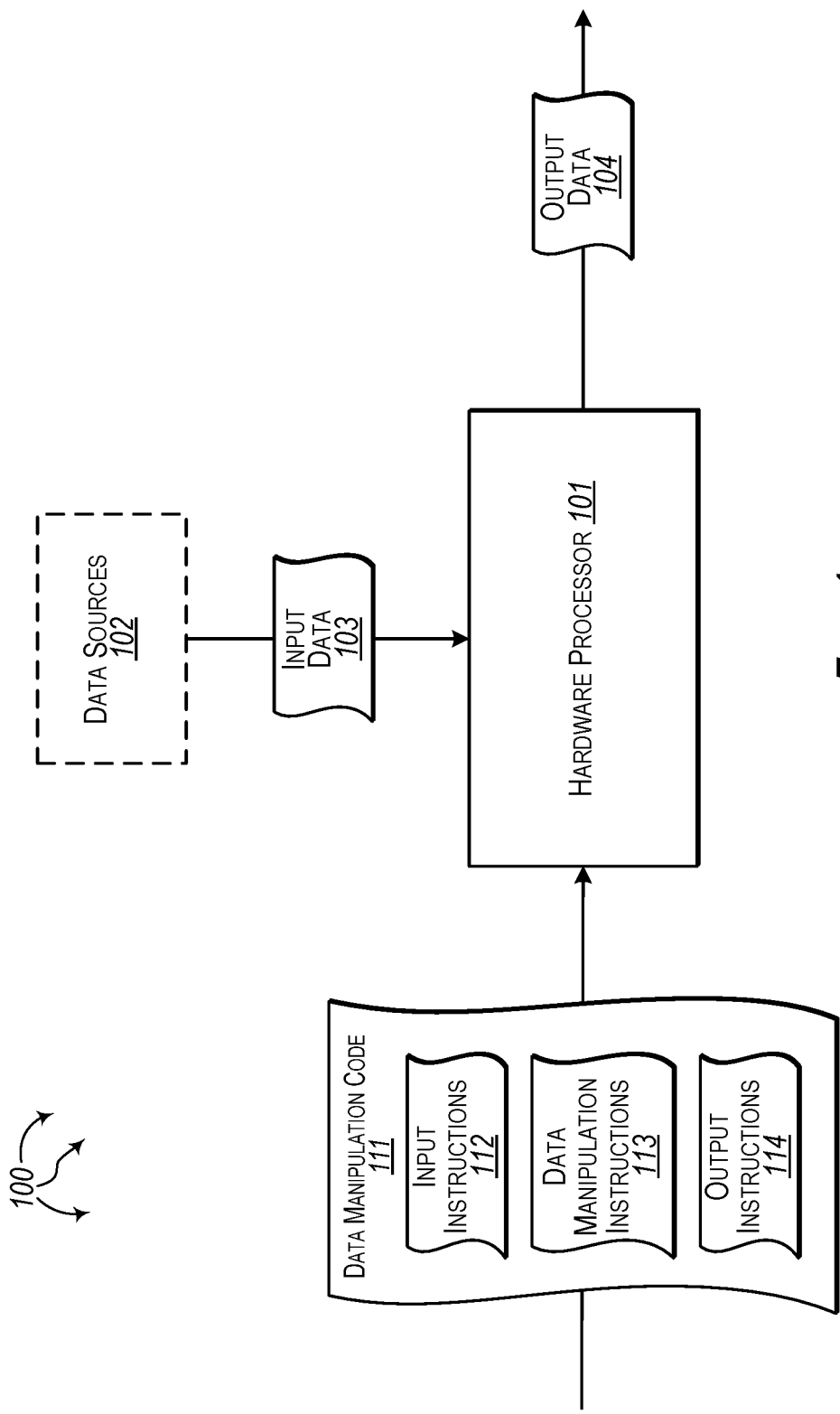
FIG. 1 illustrates an example computer architecture that facilitates running data manipulation code for a data science process.

Examples extend to methods, systems, and computer program products for transforming data manipulation code into data workflow. Data manipulation code for a data science process is accessed. The data manipulation code includes data instructions in a programming language. The data instructions including data input instructions for accessing data from one or more data sources, data manipulation instructions for manipulating the data accessed from the one or more data sources, and data output instructions for outputting data formed by the data manipulation instructions.

A machine learning algorithm (e.g., automatically and without human intervention) transforms the data manipulation code into a data workflow representative of the data science process. The data workflow provides a view on the data input instructions, data manipulation instructions, and data output instructions. The machine learning algorithm was previously trained using training data manipulation code sets and corresponding expected data workflows. The data workflow is output to document the data science process.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: data manipulation code, input instructions, data manipulation instructions, output instructions, input data, output data, detail settings, data workflow, input views, data manipulation views, output views, feedback, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, data manipulation code, input instructions, data manipulation instructions, output instructions, input data, output data, detail settings, data workflow, input views, data manipulation views, output views, feedback, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and in the following claims, "data manipulation" is defined as virtually any manipulation of data including computations and calculations on data. Data manipulation includes mathematical operations on data such as, for example, merge, combine, sum, percentage calculations, etc. Data manipulation also includes other operations on data, such as, for example, operations associated with data mining, data cleansing (e.g., anomaly identification and processing), machine learning algorithm training, validation, testing, prediction, output production, etc.

In this description and the following claims, a "data science process" is defined as a process for extracting knowledge or insights from data in various forms, either structured or unstructured. A data science process can use data manipulations to manipulate data in a variety of ways to extract knowledge or insights from the data. A data science process can employ techniques and theories from many fields within the areas of mathematics, statistics, operations research, information science, and computer science, including signal processing, probability models, machine learning, statistical learning, data mining, databases, data engineering, pattern recognition and learning, visualization, predictive analytics, uncertainty modeling, data warehousing, data compression, computer programming, artificial intelligence, and high performance computing. Data science processes can also utilize techniques that scale large data sets (sometimes referred to as "big data").

As such, data science processes can include (potentially significant) multi-step data manipulations on large quantities of data across multiple databases, tables, etc. as well as additional data manipulation by source code written in various data programming languages.

Aspects of the invention include automatically generating data workflow from data manipulation code. The data manipulation code can be written in a data manipulation programming language, such as, for example, SQL, R, Python, etc. The data manipulation code can define input instructions, data manipulation instructions, and output instructions. When executed, the input instructions can access data from one or more data sources (e.g., databases). When executed, the data manipulation instructions can manipulate the data accessed from the one or more data sources. When executed, the data output instructions output data formed by the data manipulation instructions.

As such, input for transformation can be the code used to pull, manipulate and generate output from the data. Corresponding output can be a data workflow indicating a view on data input, operations, and output. In some aspects, the level of detail for a data workflow is tailored for an intended audience and/or for subsequent editing with an editor program (e.g., a drawing program).

Aspects of the invention address the disconnection between designing a data science process and documenting the data science process. Data workflow creation is automated by automating otherwise manual activities used to create data workflow documentations. The need for manual data workflow generation is virtually eliminated resulting in significant productive gains for data scientists, data engineers, developers, and program managers.

Aspects of the invention can be implemented by using learning algorithms on input scripts. Learning rules can be used to indicate mappings between portions of data manipulation code and corresponding data workflow elements. For example, a rule can indicate that input instructions (e.g., "read.csv") map to an input file tab in a data workflow. Similarly, a rule can indicate that data manipulation instructions (e.g., mathematical operators and functions, statistical functions, data transformation functions, etc.) map to a data manipulation tab in a data workflow. Likewise, a rule can indicate that output instructions (e.g., "write.csv") map to an output tab in a data workflow. Using a learning approach, a learning module (e.g., a neural network) can be trained from a set of scripts and corresponding expected data workflows.

FIG. 1 illustrates an example computer architecture 100 that facilitates running data manipulation code for a data science process. Referring to FIG. 1, computer architecture 100 includes hardware processor 101 and data sources 102. hardware processor 101 and data sources 102 can be connected to (or be part of) a network, such as, for example, a system bus, a Local Area Network ("LAN"), a Wide Area Network ("WAN"), and even the Internet. Accordingly, hardware processor 101 and data sources 102 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

As depicted, hardware processor 101 receives data manipulation code 111. Data manipulation code 111 can be sent to hardware processor 101 by a user or other computer system components. In one aspect, hardware processor 101 retrieves data manipulation code 111 from system memory.

Data manipulation code 111 can be code for implementing a data science process. Data manipulation code 111 can be written in a programming language, such as, for example, SQL, Python, R, etc. Data manipulation code 111 includes input instructions 112, data manipulation instructions 113, and output instructions 114. Data manipulation instructions 112 are configured to access data from one or more data sources. Data manipulation instructions 113 are configured to manipulate data accessed from the one or more data sources. Data manipulation can include performing various manipulations and/or calculations on accessed data as part of the data science process. Output instructions 114 are configured to output data formed by the data manipulation instructions.

Hardware processor 101 can execute data manipulation code 111. During execution, input instructions 112 access input data 103 from data sources 102 (e.g., one or more databases). During execution, data manipulation instructions 113 perform the various manipulations and/or calculations on input data 103 to form output data 104. During execution, output instructions 114 output data 104. Output instructions 114 can output data 104 to system memory, to durable storage, to a display device, etc.

Figure 2:
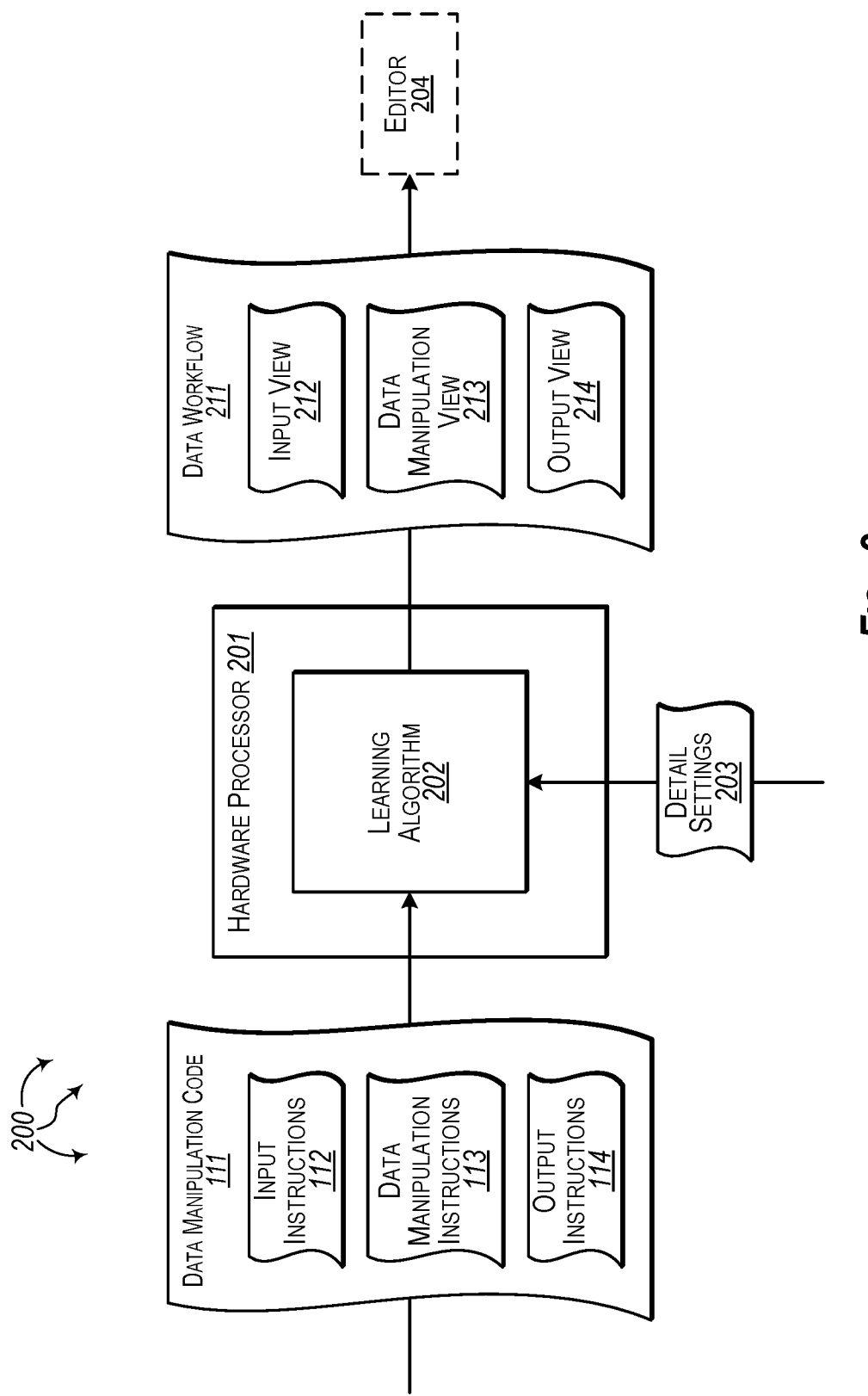
FIG. 2 illustrates an example computer architecture that facilitates transforming data manipulation code into data workflow.

FIG. 2 illustrates an example computer architecture 200 that facilitates transforming data manipulation code into data workflow. Referring to FIG. 2, computer architecture 200 includes hardware processor 201, learning algorithm 202, and editor 204. Hardware processor 201, learning module 202, and editor 204 can be connected to (or be part of) a network, such as, for example, a system bus, a Local Area Network ("LAN"), a Wide Area Network ("WAN"), and even the Internet. Accordingly, hardware processor 201, learning algorithm 202, and editor 204 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, learning algorithm 202 is configured to automatically transform data manipulation code for implementing a data science process into a representative data workflow documenting the data science process. Learning algorithm 202 can utilize learning rules that define how to transform portions of data manipulation code to corresponding data workflow elements.

In some aspects, learning algorithm 202 utilizes machine learning to increase the quality of formulated data workflows. Learning algorithm 202 can implement virtually any type of machine learning, such as, for example, supervised learning, semi-supervised learning, unsupervised learning, reinforced learning, deep learning, etc. Thus, learning algorithm 202 can be trained to transform data manipulation instructions to data workflows from a set of scripts and corresponding expected data workflows.

As an example, learning algorithm 202 can be a neural network. The neural network can be architected in accordance with a multi-layer model. A multi-layer neural network model can include an input layer, a plurality of hidden layers, and an output layer. A multi-layer neural network model may also include a loss layer. The input layer can receive data manipulation code. The plurality of hidden layers can perform a number of (e.g., non-linear) transformations on the data manipulation code. At the end of the transformations, the output layer yields a data workflow inferred by the neural network.

In one aspect, rules indicate mappings between data manipulation instructions and corresponding data workflow elements. For example, rules can indicate that input instructions map to an input file tab in a data workflow. Likewise, rules can indicate that data manipulation instructions map to a data manipulation tab in a data workflow. Similarly, rules can indicate that output instructions map to an output file tab in a data workflow.

Editor 204 can be used to edit automatically (as well as manually) generated data workflows. In one aspect, editor 204 is a drawing program. Data workflows can be edited to (e.g., fine) tune the data workflows.

Also depicted in computer architecture 200 are detail settings 203. Detail settings 203 can define a level of detail for a data workflow. In some aspects, detail settings 203 are configurable (adjustable) to tailor the level of detail for a data workflow. A level of detail can be tailored for an intended target audience (e.g., having more or less technical expertise). For example, detail settings 203 can be configured to produce data workflows with reduced detail for less (or non) technical personnel (e.g., investors, CEOs, CFOs, etc.). On the other, detail settings 203 can be configured to produce data workflows with increased detail for more technical personnel (e.g., engineering managers, system architects, etc.).

A level of detail can also be tailored to an intended editable format. For example, detail settings 203 can be configured to produce data workflows compatible with editor 204.

Detail settings 203 can also be configured to tailor multiple different levels of detail simultaneously. For example, detail settings 203 can be configured to simultaneously produce data workflows for less (or non) technical personnel and more technical personnel.

Detail settings 203 can also be configured to simultaneously tailor a level of detail for an intended editable format and for an intended audience. For example, detail settings 203 can be configured to produce data workflows for more technical personnel that are also compatible with editor 204.

Figure 3:
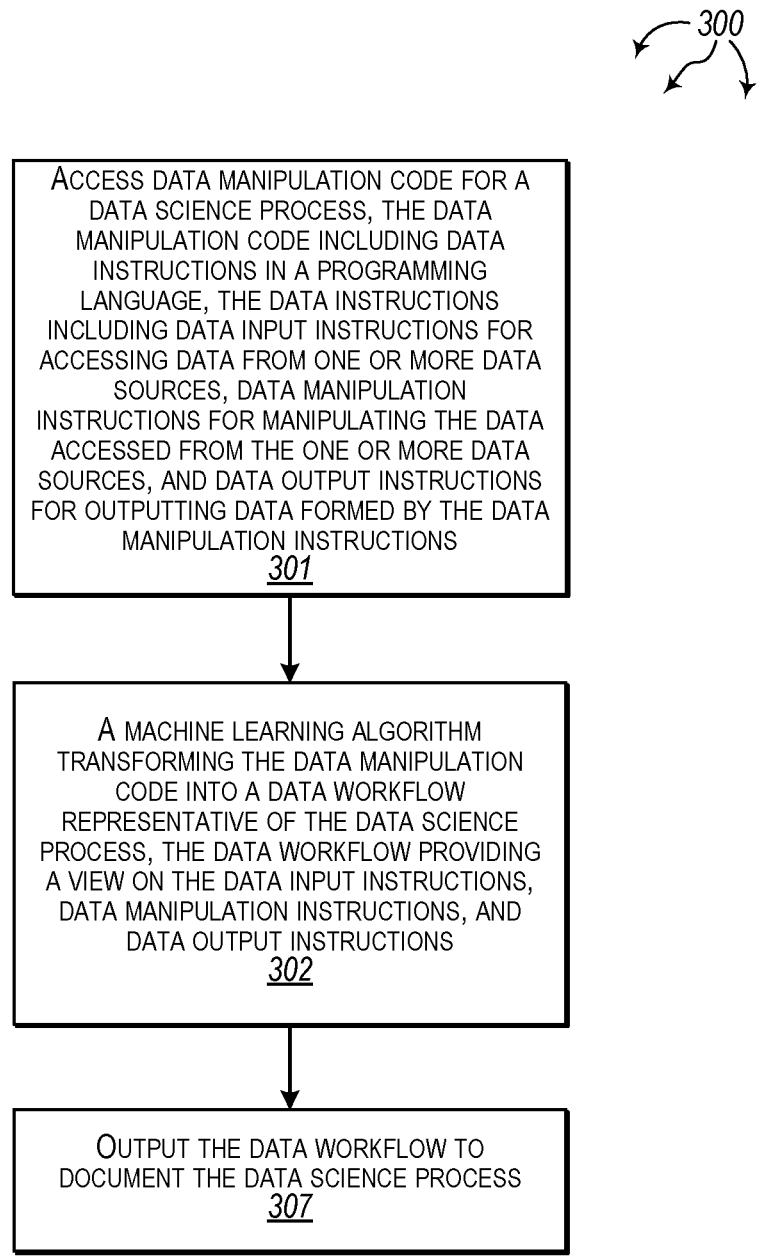
FIG. 3 illustrates a flow chart of an example method for transforming data manipulation code into data workflow.

FIG. 3 illustrates a flow chart of an example method 300 for transforming data manipulation code into data workflow. Method 300 will be described with respect to the components and data of computer architecture 200.

Method 300 includes accessing data manipulation code for a data science process, the data manipulation code including data instructions in a programming language, the data instructions including data input instructions for accessing data from one or more data sources, data manipulation instructions for manipulating the data accessed from the one or more data sources, and data output instructions for outputting data formed by the data manipulation instructions (301). For example, learning algorithm 202 can access data manipulation code 111. As described, data manipulation code 111 includes input instructions 112, data manipulation instructions 113, and output instructions 114. Data manipulation code 111 can be sent to learning algorithm 202 from a user or other computer system components.

Method 300 includes transforming the data manipulation code into a data workflow representative of the data science process, the data workflow providing a view on the data input instructions, data manipulation instructions, and data output instructions (302). For example, learning algorithm 202 can (e.g., automatically and without human intervention) transform data manipulation code 111 into data workflow 211. As depicted, data workflow 211 includes input view 222, data manipulation view 223, and output view 224. Input view 222 provides a view on input instructions 112. Data manipulation view 223 provides a view on data manipulation instructions 113. Output view 224 provides a view on output instructions 114.

Method 300 includes outputting the data workflow to document the data science process (303). For example, learning algorithm 202 can output data workflow 211. Data workflow 211 can document data manipulation code 111. It may be that data workflow 211 is output to editor 204 (e.g., a drawing program) for further editing. Alternately, data workflow 211 can be output to durable storage.

In some aspects, learning algorithm 202 utilizes detail settings 203 to tailor the level of detail in data workflow 211. Based on detail settings 203, learning algorithm 202 can tailor the level of detail in data workflow 211 for an intended audience and/or for compatibility with editor 204 (or some other editing program).

Figure 5:
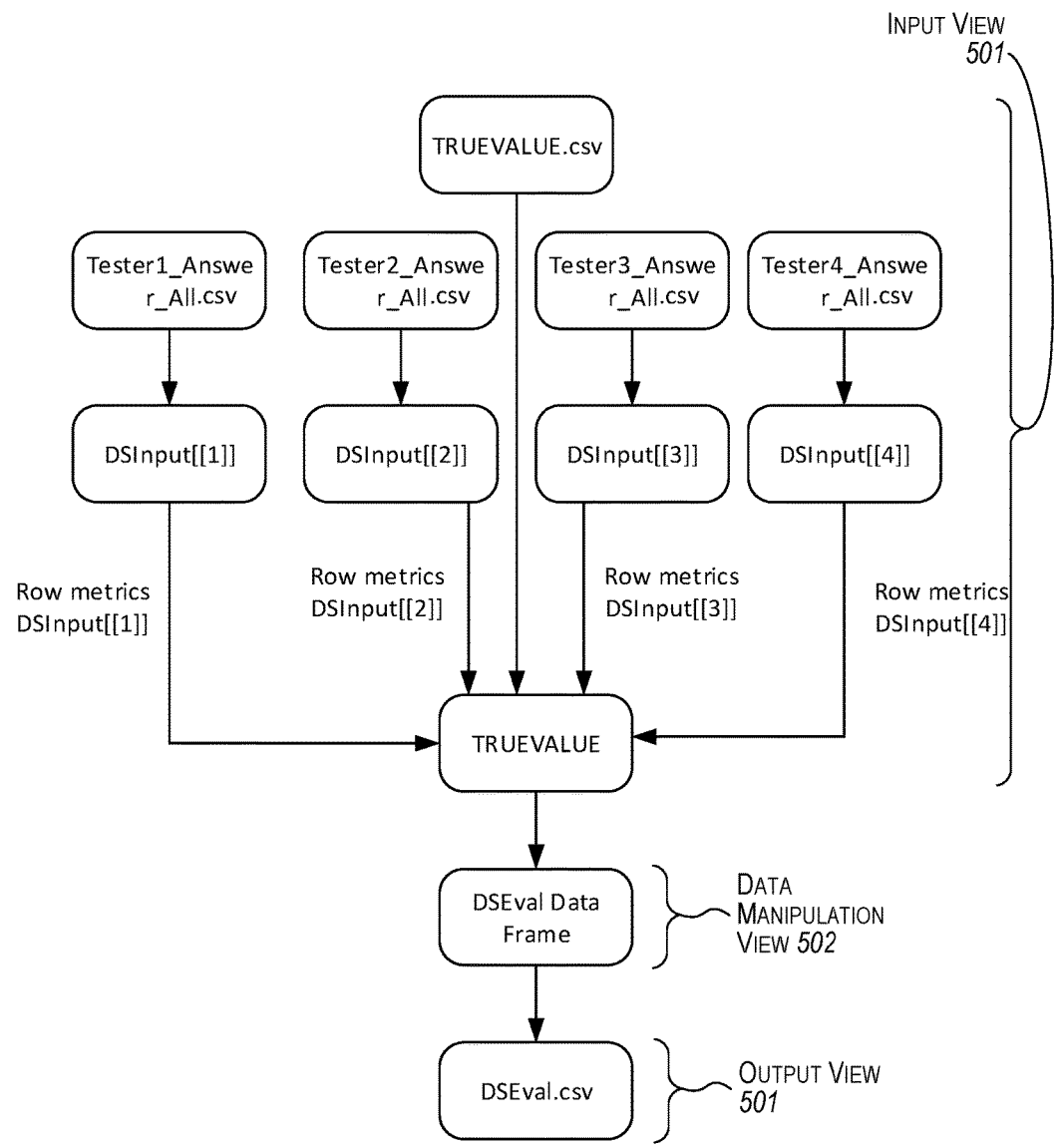
FIG. 5 is an example of data workflow.

FIG. 4 is an example of data manipulation code 400. FIG. 5 is an example of data workflow 500 that can be automatically produced for data manipulation code 400 (e.g., by learning module 202 or a similar module).

Referring to FIG. 4, data manipulation code 400 includes input instructions 401, data manipulation instructions 402, and output instructions 403. Input instructions 401 read in prediction data from several sources as well as the true value. Data manipulation instructions 402 measure the metrics of the prediction data. Output instructions 403 write output files of the measured metrics.

Turning to FIG. 5, input view 501 represents a view of input instructions 401. Data manipulation view 502 represents a view of data manipulation instructions 402. Output view 503 represents a view of output instructions 403. As such, the flow of data manipulation code 400 can be presented in a more understandable format (relative to data manipulation code 400 itself).

In some aspects, a data workflow is generated automatically from execution of data manipulation code. For example, in response to running a script, a higher level data flow process can be generated automatically. Automatic generation of data workflows enables more efficient documentation of data science processes resulting in significant productivity gain for data scientists, data engineers, developers, and program managers.

Figure 6:
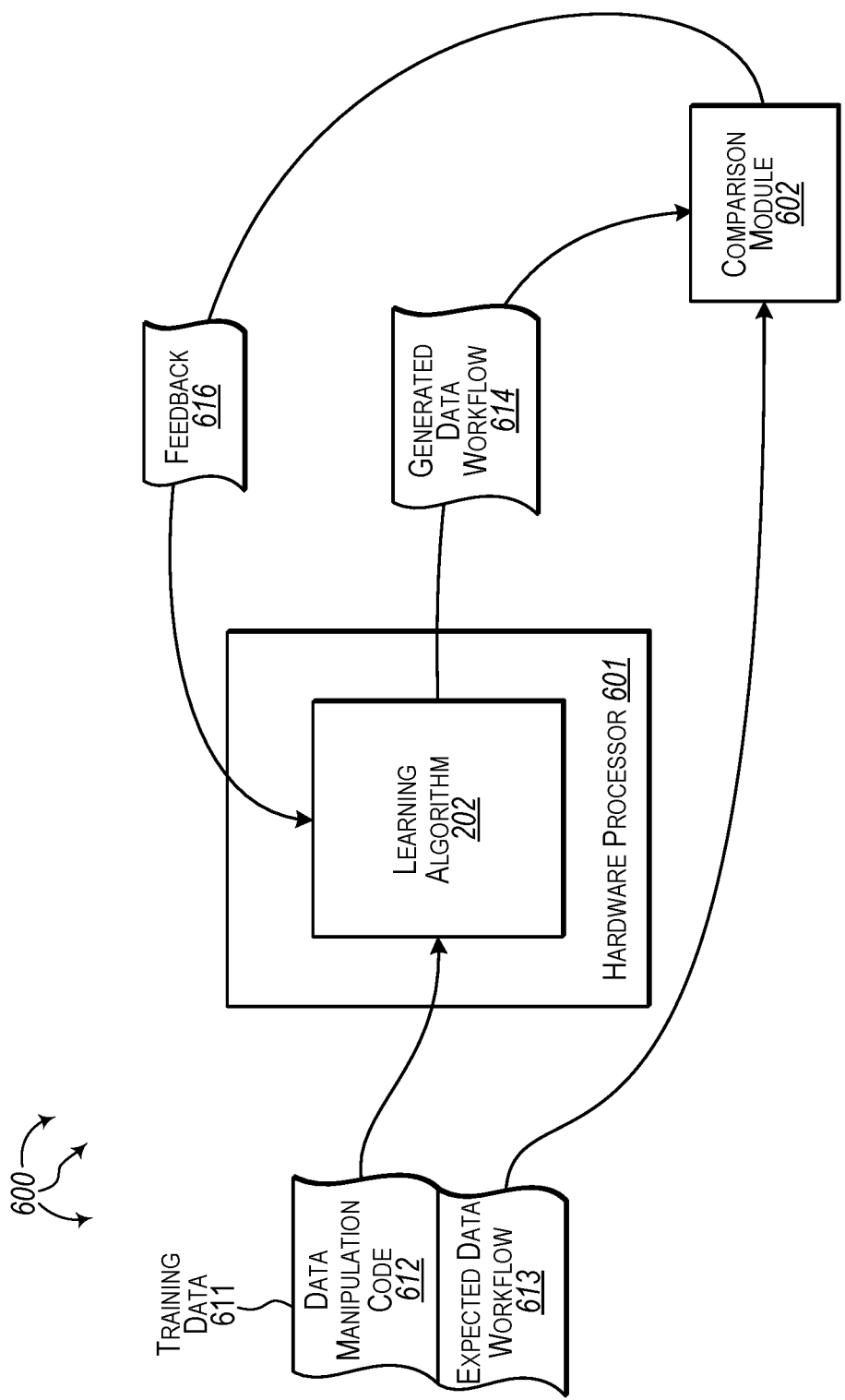
FIG. 6 illustrates an example computer architecture that facilitates training a learning algorithm.

Turning to FIG. 6, FIG. 6 illustrates an example computer architecture 600 that facilitates training learning algorithm 202. As depicted, learning algorithm 202 is running on hardware processor 601. Learning module 202 can receive training data 611. Training data 611 includes data manipulation code 612 and expected data workflow 613. Data manipulation code 612 can include input operations, data manipulation operations, and output operations. Expected data workflow 613 represents a data workflow expected from transforming data manipulation code 612. In one aspect, expected data workflow 613 is manually generated for training purposes.

Learning algorithm 202 transforms data manipulation code 612 into generated data workflow 614. Comparison module 602 compares expected data workflow 613 to generated data workflow 614. Differences between expected data workflow 613 to generated data workflow 614 are provided back to learning module 202 as feedback 616. Learning algorithm 202 can adjust internal operations based on feedback 616 to increase accuracy of subsequent transformations of data manipulation code to data workflow.

In some aspects, multiple sets of training data are used to train learning algorithm 202 prior to using learning module 202 in a production environment. For example, learning algorithm 202 can be trained prior to learning algorithm 202 transforming data manipulation code 111 into data workflow 211. Using training data also facilitates better training of learning algorithm 202 overtime. In turn, learning algorithm 202 can generate higher quality data workflows as output.

In some aspects, a computer system comprises one or more hardware processors and system memory. The one or more hardware processors are configured to execute instructions stored in the system memory to automatically transform data manipulation code into data workflow.

The one or more hardware processors execute instructions stored in the system memory to access data manipulation code for a data science process. The data manipulation code includes data instructions in a programming language. The data instructions include data input instructions for accessing data from one or more data sources, data manipulation instructions for manipulating the data accessed from the one or more data sources, and data output instructions for outputting data formed by the data manipulation instructions.

The one or more hardware processors execute instructions stored in the system memory to have a machine learning algorithm transform the data manipulation code into a data workflow representative of the data science process. The data workflow provides a view on the data input instructions, data manipulation instructions, and data output instructions. The machine learning algorithm was previously trained using training data manipulation code sets and corresponding expected data workflows. The one or more hardware processors execute instructions stored in the system memory to output the data workflow to document the data science process.

In some aspects, the one or more hardware processors execute instructions stored in the system memory to tailor the detail of a data workflow for an intended audience and/or an intended editable format.

Computer implemented methods for performing the executed instructions to automatically transform data manipulation code into data workflow are also contemplated. Computer program products storing the instructions, that when executed by a processor, cause a computer system to automatically transform data manipulation code into data workflow are also contemplated.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system comprising:
a hardware processor;
system memory coupled to the hardware processor and storing instructions configured to cause the hardware processor to:
access data manipulation code configured to perform a data science process, the data manipulation code converted from instructions in a programming language, the instructions including data input instructions for accessing data from one or more data sources, data manipulation instructions for manipulating the data accessed from the one or more data sources, and data output instructions for outputting data formed by the data manipulation instructions;
access detail settings indicating a level of detail, from among of range of possible levels of detail, tailored to an intended target audience of a data workflow;
transform the data manipulation code into the data workflow documenting the data science process with the indicated level of detail, the data workflow providing a view on the data input instructions, data manipulation instructions, and data output instructions; and
output the data workflow to tailor documentation of the data science process to the intended target audience.

2. The computer system of claim 1, wherein instructions configured to cause the hardware processor to access data manipulation code configured to perform a data science process comprise instructions configured to cause the hardware processor to access data manipulation code having data input instructions configured to access data from one or more databases.

3. The computer system of claim 1, wherein instructions configured to cause the hardware processor to access detail settings comprise instructions configured to cause the hardware processor to access detail settings indicating a level of detail corresponding to the technical expertise of the intended target audience.

4. The computer system of claim 1, wherein instructions configured to cause the hardware processor to access detail settings comprise instructions configured to cause the hardware processor to access configurable detail settings configured to tailor the level of detail to an intended editable format of the data workflow.

5. The computer system of claim 4, wherein instructions configured to cause the hardware processor to output the data workflow comprise instructions configured to cause the hardware processor to output the data workflow in the editable format with the indicated level of detail.

6. The computer system of claim 1, wherein instructions configured to cause the hardware processor to output the data workflow comprise instructions configured to cause the hardware processor to output the data workflow in an editable format to facilitate further modification via an external program.

7. The computer system of claim 1, wherein instructions configured to cause the hardware processor to transform the data manipulation code into a data workflow documenting the data science process comprises a neural network transforming the data manipulation code into the data workflow.

8. A processor implemented method for use at a computer system, the method comprising:
    accessing executable code configured to perform a data science process, the executable code converted from instructions in a programming language, the instructions including data input instructions for accessing data from one or more data sources, data manipulation instructions for manipulating the data accessed from the one or more data sources, and data output instructions for outputting data formed by the data manipulation instructions;
    accessing detail settings indicating a level of detail, from among of range of possible levels of detail, tailored to an intended target audience of a data workflow;
    transforming, using an algorithm, the executable code into the data workflow documenting the data science process with the indicated level of detail, the data workflow providing a view on the data input instructions, data manipulation instructions, and data output instructions, the algorithm having been previously configured to transform executable code into the data workflow based at least on a plurality of executable code sets and corresponding expected representative data workflows; and
    outputting the data workflow to tailor documentation of the data science process to the intended target audience.

9. The method of claim 8, wherein accessing executable code configured to perform a data science process comprises accessing data manipulation code having data input instructions configured to access data from one or more databases.

10. The method of claim 8, wherein accessing detail settings comprises accessing detail settings indicating a level of detail corresponding to the technical expertise of the intended target audience.

11. The method of claim 8, wherein accessing detail settings comprises accessing configurable detail settings configured to tailor the level of detail to an intended editable format of the data workflow.

12. The method of claim 11, wherein transforming the executable code into the data workflow comprises transforming the data workflow into the editable format with the indicated level of detail.

13. The method of claim 8, wherein outputting the data workflow comprises outputting the data workflow in an editable format to facilitate further modification via an external editing program.

14. The method of claim 8, wherein transforming the executable code into the data workflow comprises a neural network transforming the executable code into the data workflow.

15. A computer program product for use at a computer system, the computer program product comprising one or more hardware storage devices having stored thereon computer-executable instructions that, when executed at a processor, cause the computer system to perform the following:
    access data manipulation code configured to perform a data science process, the data manipulation code converted from instructions in a programming language, the instructions including data input instructions for accessing data from one or more data sources, data manipulation instructions for manipulating the data accessed from the one or more data sources, and data output instructions for outputting data formed by the data manipulation instructions;
    access detail settings indicating a level of detail, from among of range of possible levels of detail, tailored to an intended target audience of a data workflow;
    transform, using a machine learning algorithm, the data manipulation code into the data workflow documenting the data science process with the indicated level of detail, the data workflow providing a view on the data input instructions, data manipulation instructions, and data output instructions, the machine learning algorithm having been previously trained using training data manipulation code sets and corresponding expected representative data workflows; and
    output the data workflow to tailor documentation of the data science process to the intended target audience.

* * * * *